(12) United States Patent
Gray et al.

(10) Patent No.: US 12,467,648 B2
(45) Date of Patent: Nov. 11, 2025

(54) AIR PURIFIER WITH PLANT POT

(71) Applicant: DUPRAY VENTURES INC., Montreal (CA)

(72) Inventors: Brent Gray, Montreal (CA); Michel Morand, Verdun (CA); Guillaume Cavalie, Montreal (CA)

(73) Assignee: DUPRAY VENTURES INC., Montreal (CA)

( * ) Notice: Subject to any disclaimer, the term of this patent is extended or adjusted under 35 U.S.C. 154(b) by 338 days.

(21) Appl. No.: 18/040,416

(22) PCT Filed: Sep. 22, 2021

(86) PCT No.: PCT/CA2021/051319
§ 371 (c)(1),
(2) Date: Feb. 2, 2023

(87) PCT Pub. No.: WO2022/061454
PCT Pub. Date: Mar. 31, 2022

(65) Prior Publication Data
US 2023/0280055 A1    Sep. 7, 2023

Related U.S. Application Data

(60) Provisional application No. 63/081,373, filed on Sep. 22, 2020.

(51) Int. Cl.
*F24F 8/10* (2021.01)
*A01G 9/02* (2018.01)
(Continued)

(52) U.S. Cl.
CPC ............... *F24F 8/108* (2021.01); *A01G 9/02* (2013.01); *B01D 46/0005* (2013.01); *B01D 46/0015* (2013.01)

(58) Field of Classification Search
CPC ................. B01D 46/00; B01D 46/0002; B01D 46/0005; B01D 46/0015
See application file for complete search history.

(56) References Cited

U.S. PATENT DOCUMENTS

| 4,961,763 A | 10/1990 | Thompson et al. |
| 5,397,382 A | 3/1995 | Anderson |

(Continued)

FOREIGN PATENT DOCUMENTS

| CN | 204513666 U | 7/2015 |
| CN | 207881005 U | 9/2018 |

(Continued)

OTHER PUBLICATIONS

Air Purifier First, "Blueair Blue Pure 411 Review (Performance Test and Smoke Box)". Youtube.com, Jun. 21, 2020 (Jun. 21, 2020), video (length 9 minutes, 18 seconds), [online] [retrieved on Nov. 5, 2021 (Nov. 5, 2021)]. 3pgs. Retrieved from the Internet: https://www.youtube.com/watch?v=E6hdY4jPefg *entire video*.

(Continued)

*Primary Examiner* — Robert A Hopkins
(74) *Attorney, Agent, or Firm* — CANTOR COLBURN LLP

(57) ABSTRACT

An air purifier may have a casing defining a support to receive a substrate of a plant, an artificial plant and/or a removable pot. The casing forms a chamber, an outer wall of the casing defining one or more air inlets, and one or more air outlets. An air filter(s) is housed in the chamber. A fan os housed within the chamber. A motor is operable to drive the fan, whereby the fan is operable to draw in air through one or more air inlets in the casing and through the air filter, the fan further operable to expel the drawn-in air through the one or more air outlets in the casing.

31 Claims, 11 Drawing Sheets

(51) Int. Cl.
  *B01D 46/00*   (2022.01)
  *F24F 8/108*   (2021.01)

(56)   References Cited

U.S. PATENT DOCUMENTS

| | | |
|---|---|---|
| 2003/0217507 A1 | 11/2003 | Wolverton et al. |
| 2018/0304184 A1 | 10/2018 | Gunnefur |
| 2025/0003612 A1 | 1/2025 | Gray et al. |

FOREIGN PATENT DOCUMENTS

| | | | | |
|---|---|---|---|---|
| CN | 109529500 A | | 3/2019 | |
| CN | 210891966 U | * | 6/2020 | |
| CN | 111457490 A | * | 7/2020 | ............ F24F 13/20 |
| CN | 111503771 A | | 8/2020 | |
| EP | 3708916 A1 | | 9/2020 | |
| KR | 19980036245 U | * | 9/1998 | |
| KR | 20190064175 A | | 6/2019 | |
| KR | 102073557 B1 | | 1/2020 | |

OTHER PUBLICATIONS

Blueair Store, "Blueair Blue Pure 411 Genuine Replacement Filter, Particle and Activated Carbon, Fits Blue Pure 411, 411+, 411 Auto & Mini Air Purifiers". Amazon.ca, Sep. 29, 2017 (Sep. 29, 2017), [online] [retrieved on Nov. 5, 2021 (May 11, 2021)]. 9pgs. Retrieved from the Internet: https://www.amazon.ca/Replacement-Particle-Activated-Purifier-Blueair/dp/B073SLDNJW?th=1 *entire document*.

Lifesupplyusa, "5 Pack Replacement Collapsible Particle Carbon Filter fits Blueair Blue Pure 411 Air Cleaner Purifier". Newegg.ca, Mar. 17, 2020 (Mar. 17, 2020), [online] [retrieved on Nov. 5, 2021 (Nov. 5, 2021)]. 3pgs. Retrieved from the Internet: https://www.newegg.ca/p/30G-002H-00447 *entire document*.

PCT Notification of Transmittal of the International Search Report and the Written Opinion of the International Searching Authority or the Declaration; International Application No. PCT/CA2021/051319; International Filing Date: Sep. 22, 2021; Date of Mailing: Nov. 15, 2021; pp. 1-13.

EP Communication; Extended European Search Report; Application No. 21870634.9-1015 /4216769 PCT/CA2021051319; Date Mailed: Jul. 2, 2025; pp. 1-11.

* cited by examiner

AIR PURIFIER WITH PLANT POT

CROSS REFERENCE TO RELATED APPLICATIONS

This application is a National Stage application of PCT/CA2021/051319, filed Sep. 22, 2021, which claims the benefit of U.S. Provisional Application No. 63/081,373, filed Sep. 22, 2020, both of which are incorporated by reference in their entirety herein.

TECHNICAL FIELD

The present application related to air purifiers or like air filtering devices, and more particularly to air purifiers with decorative features for domestic usage.

BACKGROUND OF THE ART

Air purifiers, also known as or having similar functions as air filters, air filtration systems, are commonly found in households, offices or other spaces for purifying the ambient air, for instance by passing the air through one or more filters. Air purifiers often occupy a not-insignificant amount of floor space, which can cause issues in locations where spacing is limited. Moreover, air purifiers are often generic boxy casings that have limited decorative value.

SUMMARY

In accordance with a first aspect, there is provided an air purifier comprising: a casing defining a support to receive a substrate of a plant, an artificial plant and/or a removable pot, the casing forming a chamber, an outer wall of the casing defining one or more air inlets, and one or more air outlets; at least one air filter housed in the chamber; a fan housed within the chamber; and a motor operable to drive the fan, whereby the fan is operable to draw in air through one or more air inlets in the casing and through the at least one air filter, the fan further operable to expel the drawn-in air through the one or more air outlets in the casing.

Further in accordance with the first aspect, for instance, the air inlets and the air outlets are arranged in rows in which the air inlets and the air outlets are circumferentially distributed.

Still further in accordance with the first aspect, for instance, the rows include an upper row and a lower row.

Still further in accordance with the first aspect, for instance, the air inlets are in the lower row, and the air outlets are in the upper row.

Still further in accordance with the first aspect, for instance, the casing has an upper casing portion and a lower casing portion, the chamber defined concurrently by the upper casing portion and the lower casing portion.

Still further in accordance with the first aspect, for instance, the air inlets are in the lower casing portion.

Still further in accordance with the first aspect, for instance, the air outlets are in the upper casing portion.

Still further in accordance with the first aspect, for instance, the at least one filter is in the lower casing portion.

Still further in accordance with the first aspect, for instance, the fan and the motor are in the upper casing portion.

Still further in accordance with the first aspect, for instance, the at least one filter has an annular body, and has a central axis generally vertical in the air purifier.

Still further in accordance with the first aspect, for instance, the fan is a centrifugal fan positioned so as to draw air from a central plenum of the annular body of the filter, and expel air to the air outlets concentrically located around the centrifugal fan.

Still further in accordance with the first aspect, for instance, the annular body of the filter is mounted around a cage.

Still further in accordance with the first aspect, for instance, the cage is on a base removably connected to a bottom of the casing, the base providing access to the chamber.

Still further in accordance with the first aspect, for instance, a grill may be between the central plenum and a center of the centrifugal fan.

Still further in accordance with the first aspect, for instance, the motor is located above the fan.

Still further in accordance with the first aspect, for instance, the fan is mounted to a shaft of the motor.

Still further in accordance with the first aspect, for instance, the air inlets are vertical slits.

Still further in accordance with the first aspect, for instance, the air outlets are vertical slits.

Still further in accordance with the first aspect, for instance, the air outlets have a generally tangential orientation.

Still further in accordance with the first aspect, for instance, the casing defines an open top receptacle.

Still further in accordance with the first aspect, for instance, the removable pot is provided and is configured to be received in the open top receptacle.

Still further in accordance with the first aspect, for instance, a sleeve of fabric may be mounted on the casing to conceal the air inlets and the air outlets.

Still further in accordance with the first aspect, for instance, the sleeve is made of a stretchable fabric.

Still further in accordance with the first aspect, for instance, the casing defines an annular channel on its out surface to receive an edge of the sleeve.

In accordance with a second aspect, there is provided an air filter comprising: a panel of porous material adapted to be used as a filter, the panel being made of a non-rigid material, the panel having a sleeve shape with opposed open ends, the sleeve shape defining an inner surface and an outer surface between the opposed open ends; wherein the panel is in a native collapsed state; wherein the inner surface of the air filter is sized for the panel to adopt a tubular shape with the porous material being taut to a filtering state when the air filter is mounted onto a support being positioned against the inner surface of the air filter.

Further in accordance with the second aspect, for instance, the inner surface has a constant cross-sectional dimension from one of the open ends to the other of the opposed ends.

Still further in accordance with the second aspect, for instance, further including the support.

Still further in accordance with the second aspect, for instance, the support is a cage.

Still further in accordance with the second aspect, for instance, the cage is cylindrical or frusto-conical.

Still further in accordance with the second aspect, for instance, the support includes a base plate from which the cage projects.

Still further in accordance with the second aspect, for instance, the support includes an annular cover releasably connectable to the cage.

Still further in accordance with the second aspect, for instance, the porous material is in an accordion configuration.

Still further in accordance with the second aspect, for instance, the porous material is a non-woven fabric.

Still further in accordance with the second aspect, for instance, a layer of another porous material surrounded by the accordion configuration.

Still further in accordance with the second aspect, for instance, the other porous material is a charcoal or active carbon filter.

Still further in accordance with the second aspect, for instance, including at least one polymeric ring secured to an inner circumferential surface of the porous material in the accordion configuration.

Still further in accordance with the second aspect, for instance, rays project from the polymeric ring and secure adjacent panels of the accordion configuration to one another Many further features and combinations thereof concerning the present improvements will appear to those skilled in the art following a reading of the instant disclosure.

DETAILED DESCRIPTION

Figure 1:
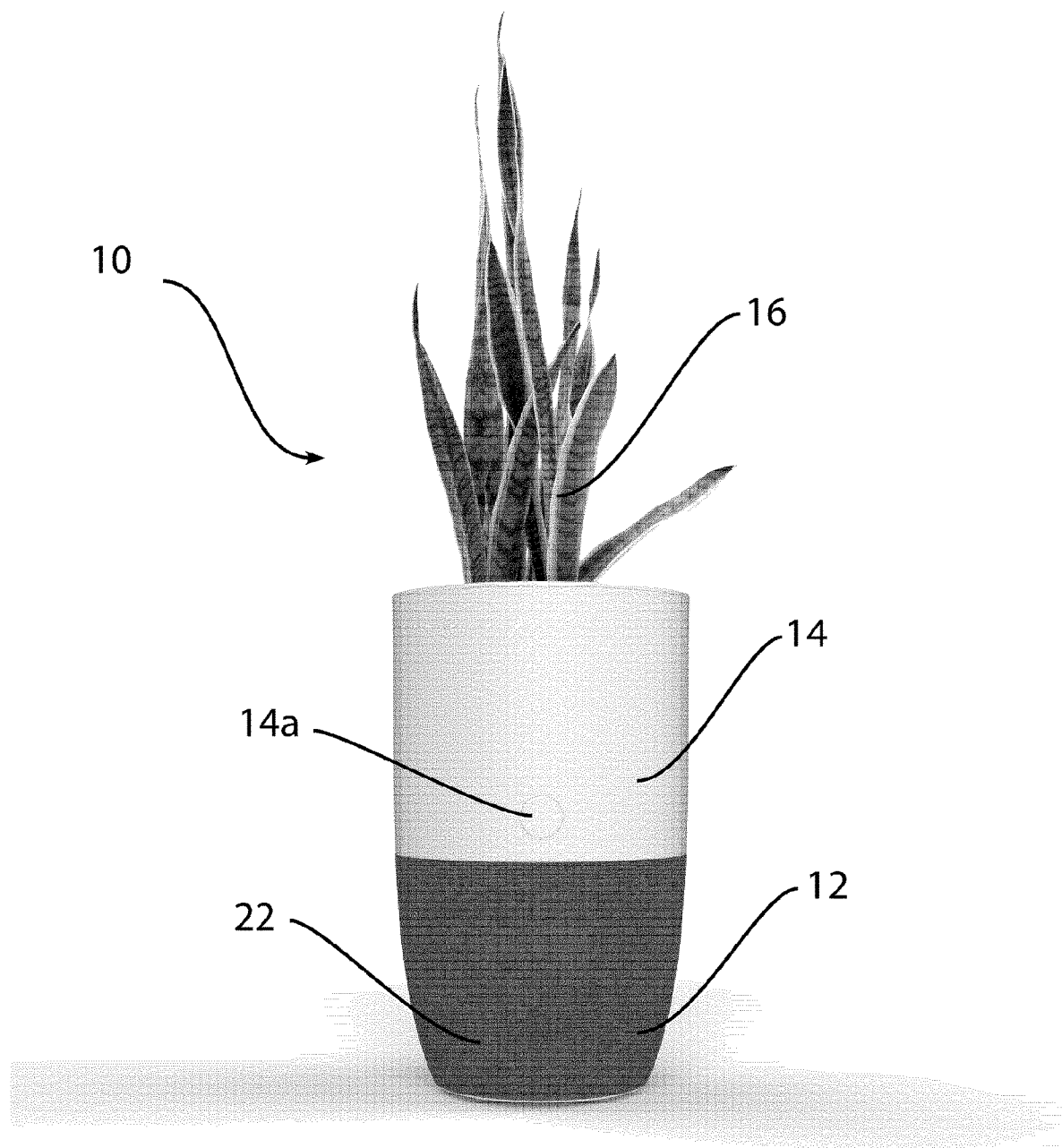
FIG. 1 is a front view of an air purifier receiving a potted plant according to an embodiment of the present disclosure.

Referring to FIG. 1, there is shown an air purifier 10 in accordance with an embodiment of the present disclosure. The expression "air purifier" is used to describe the fact that the apparatus 10 has the capacity of performing some air purifying action, such as removing some airborne particles or contaminants, such as dust, pollen, or the like. Other expressions that may be used include air cleaner or cleaning, air filter or filtering, etc. As seen below, the air purifying may be done by using filters, for example of the type having porous membranes, though other types of filters may also be used, such as active carbon filters (a.k.a., charcoal filters), as a possibility among others. It will thus be appreciated that the expressions "filtered" or "purified" used herein refer to the removal of impurities from the ambient air to improve the ambient air quality in a given space. Such impurities may include smoke, dust, hair, pollutants, mold, mildew, bacteria, viruses or other undesirable particles. For simplicity, the expression "air purifier" is used herein.

Figure 7:
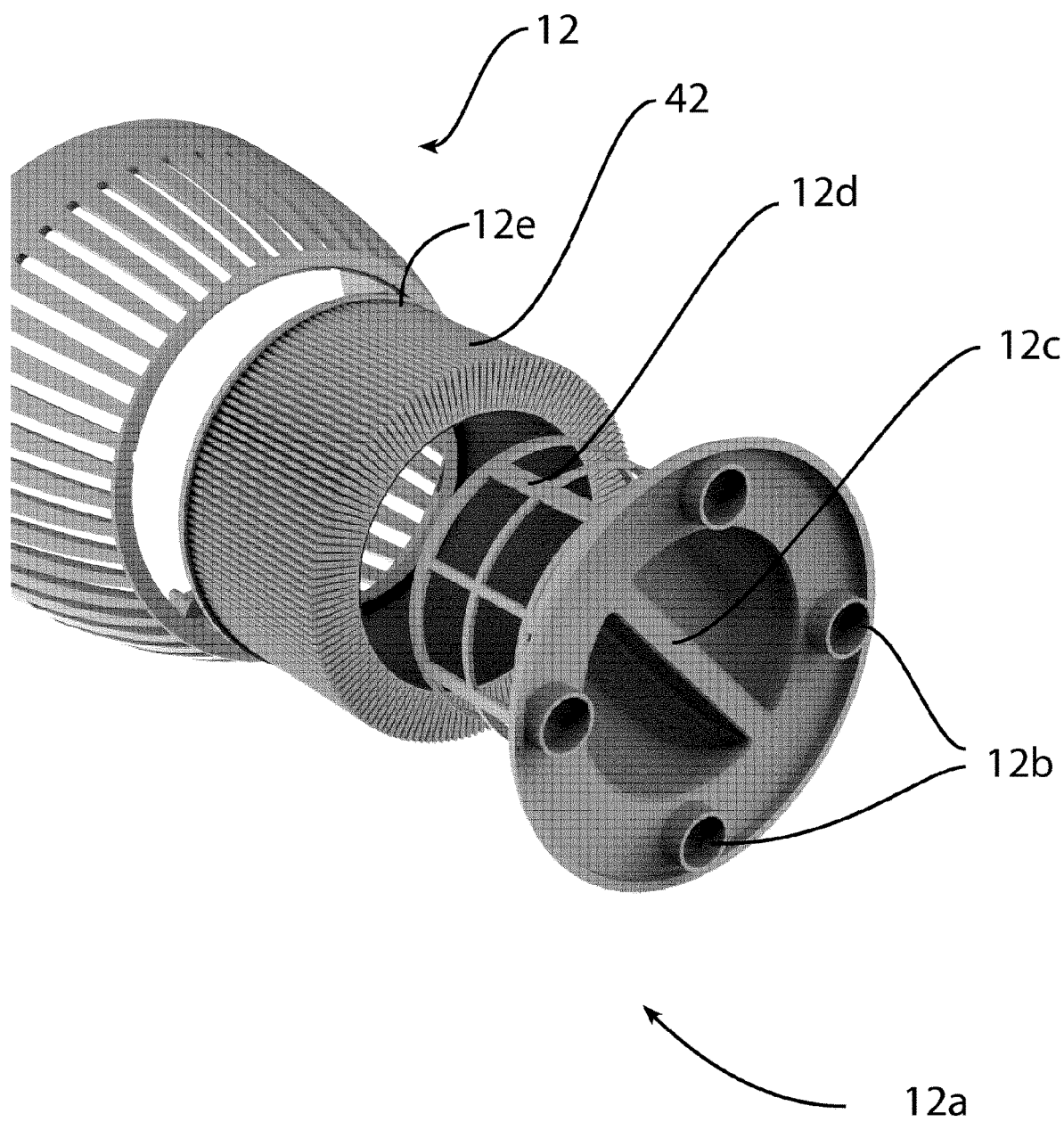
FIG. 7 is a perspective assembly view of an underside of the air purifier of FIG. 1.

The air purifier 10 is generally formed of a casing incorporating the various components of the air purifier 10. The air purifier 10 is shown herein as being formed by a lower casing portion 12 and an upper casing portion 14 concurrently forming a chamber, though a single integral casing may be used, or more than the two casing portions as well. As shown in FIG. 7, the lower casing portion 12 may have a removable base 12a, that is configured to be removed from a remainder of the lower casing portion 12 to provide access to an interior of the lower casing portion 12, for insertion or removal of a filter component. Other parts of the base 12a may include feet 12b, handle 12c, a support such as a cage 12d, and an annular cover 12e as possible components. The use of the base 12a is described below. The lower casing portion 12 may contain some air purifying components as will be discussed in further detail below, while the upper casing portion 14 may contain other air purifying components, and a button/display 14a or like interface. The upper casing portion 14 may support a plant 16 via a substrate received therein. In various embodiments, the plant 16 may be a living plant or an artificial plant. While the plant in FIG. 1 is shown to resemble a "snake plant", the air purifier 10 may be configured to receive a variety of plant or flower types and may be sized accordingly. The air purifier 10 may also be used to cultivate produce. As will be discussed in further detail below, the air purifier 10 draws in ambient air through one or more air inlets, for instance in the lower casing portion 12, purifies the air by passing it through one or more filters, and expels the filtered or purified air back into the surrounding environment, for instance through one or more air outlets in the upper casing portion 14, although other arrangements for the inlets and/or outlets may be considered. In addition, the air purifier 10 supports the plant 16 in an opening in the upper casing portion 14. The air purifier 10 may be arranged so that the filtered or purified air being expelled into the surrounding environment does not come into contact with the plant 16, though it could. Further, the air purifier 10 is designed to avoid penetration of water or dirt associated with the plant 16 in the upper casing portion 14 (in cases where the plant 16 is a living plant) into the internal sections of the air purifier 10, preventing the electric or electronic components housed within the air purifier 10 from being damaged by such water or dirt.

Figure 2:
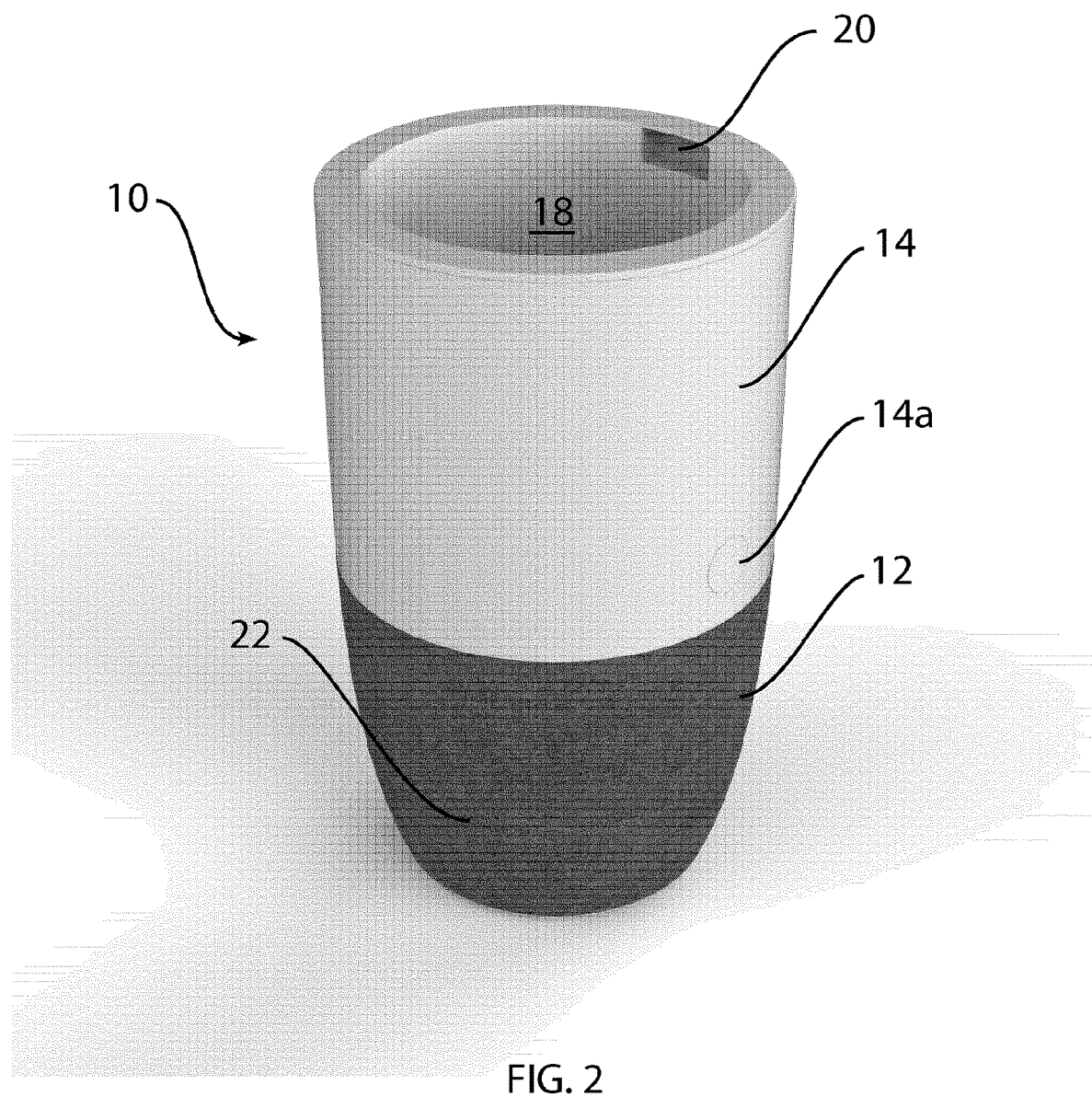
FIG. 2 is a perspective view of the air purifier of FIG. 1.

Referring to FIG. 2, the upper casing portion 14 may include an open top, an outer wall and/or a bottom wall defining a top open hollow inner receptacle in which a removable pot 18 may be insertable. A substrate (e.g., dirt, soil, black earth, gravel) for the plant 16 may be received within the removable pot 18. As will be discussed in further detail below, the removal of removable pot 18 may be facilitated by one or more handles 20 molded or integrated into an upper portion of the removable pot 18. However, it is contemplated to have the plant substrate received directly into the receptacle of the upper casing portion 14. Alternatively, the pot 18 need not be part of the air purifier 10, with generic pots purchased separately with plants installed into the receptacle of the upper casing portion 14. In cases where the plant 16 may be an artificial plant, it may be contemplated to forgo the upper casing's 14 open top and hollow inner receptacle and place the artificial plant, for instance seated on a flat platform, on an upper surface of the upper casing portion 14. Herein, when reference is made to the substrate of the plant 16, this includes the base to which artificial plants 16 are connected.

Also shown in FIG. 2 is an optional covering 22 placed over the lower casing portion 12 and partly over the upper casing portion 14. The covering 22 may be an elastic covering, and may be referred to as a sheath, a sleeve, etc. The covering 22 may be made of a fabric, a textile, a breathable molded plastic, other non-rigid sheet materials, etc. Moreover, while elasticity or stretchability is a suitable property for the covering 22, the covering 22 may not be stretchable. For simplicity, the covering 22 will be referred to as a fabric covering 22 herein, though other materials may be used for the fabric, as suggested herein. The fabric covering 22 may also cover a lower portion of the upper casing portion 14. In various embodiments, the fabric covering 22 is made from polyester or from another synthetic material in an open weave pattern, or a blend of materials (e.g., polyester and Lycra®). In some embodiments, the fabric covering 22 resembles a traditional mesh loudspeaker covering. Other materials and patterns may be considered as well. The fabric covering 22 may act as a semi-permeable membrane or breathable membrane so as to cover the inlet(s) and/or outlet(s) of the purifier system, allowing air to be drawn in through the inlet(s) and out through the outlet(s) of the air purifier 10 for purification/filtration purposes while preventing larger particles such as dirt from the plant 16 from entering and potentially damaging the internal sections of the air purifier 10. The covering 22 may also consequently conceal the inlet(s) and/or outlet(s) of the purifier system, for the air purifier nature of the pot to go unnoticed.

Figure 3:
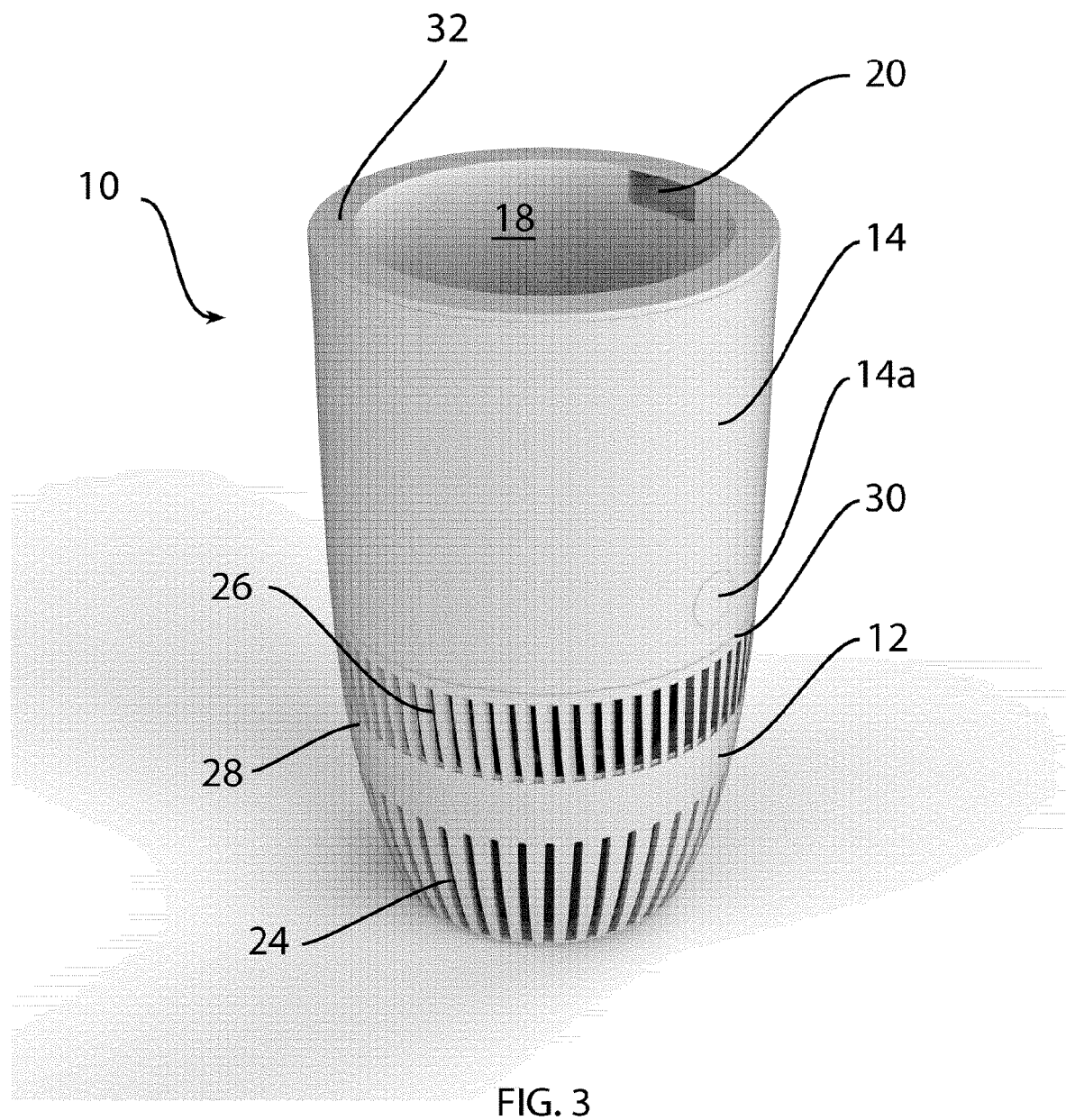
FIG. 3 is a perspective view of the air purifier of FIG. 1 with a covering removed.
Figure 4:
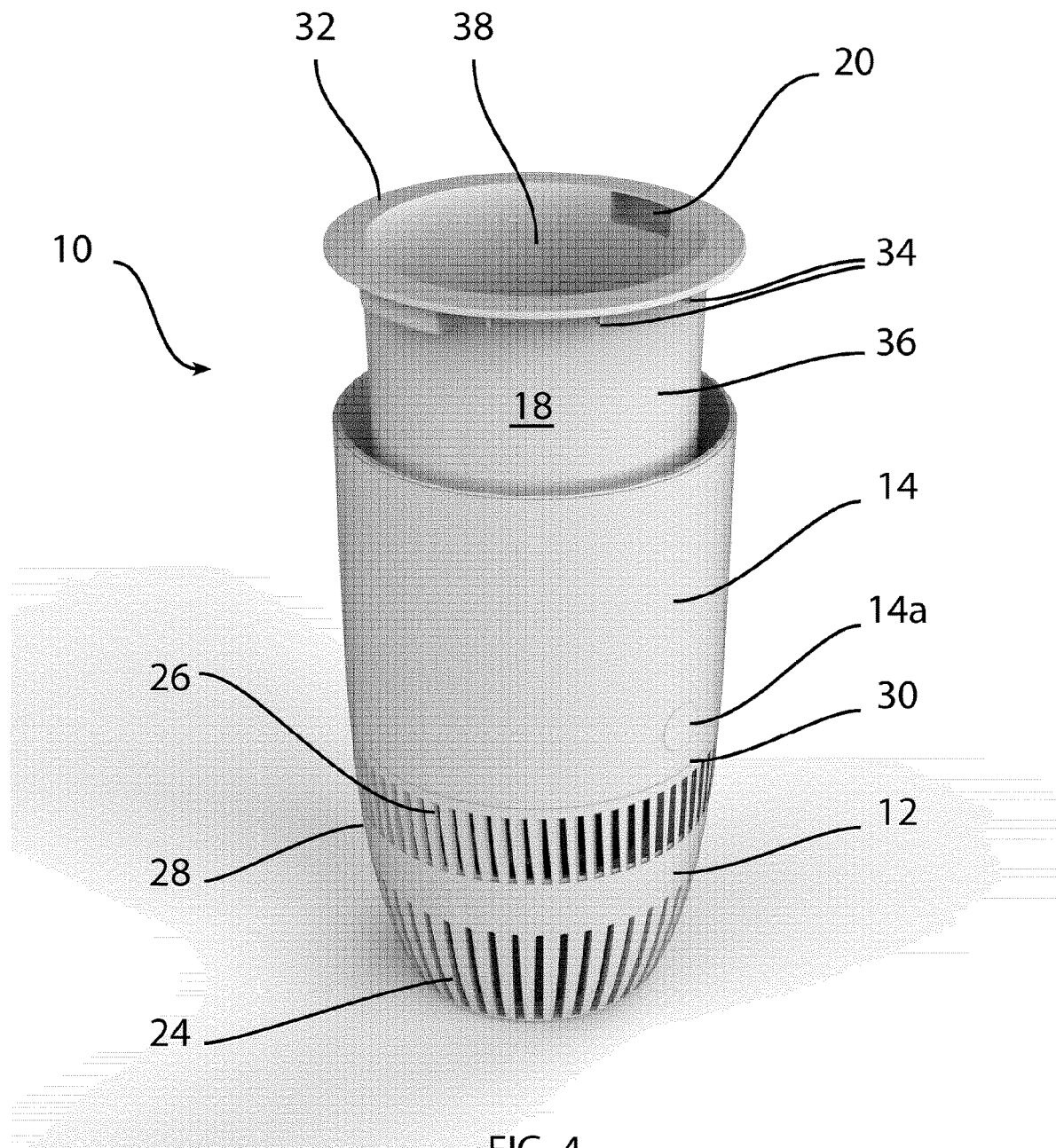
FIG. 4 is a perspective view of the air purifier of FIG. 1 with the covering removed and a removable pot partially removed.

Referring to FIGS. 3 and 4, the air purifier 10 is illustratively shown with the fabric covering 22 removed. The air purifier 10 includes one or more air inlets 24 positioned towards the bottom of the lower casing portion 12 in an outer wall of the lower casing portion 12. The air inlets 24 may for example be arranged in an annular row, in which the air inlets 24 are circumferentially distributed in the casing. One or more air outlets 26 is positioned towards the bottom of the upper casing portion 14 in the outer wall of the upper casing portion 14. The air outlets 26 may also be arranged in an annular row, in which the air outlets 26 are circumferentially distributed in the casing, and may be above the air inlets 24. The reverse arrangement or other dispositions are contemplated such as having inlets and outlets on the lower casing portion 12 only, or on the upper casing portion 14 only. Illustratively, a crease 28, typically covered by the fabric covering 22, points to where the lower casing portion 12 meets the upper casing portion 14, as the upper casing portion 14 may be deposited onto the lower casing portion 12. Precision manufacturing may ensure that the crease 28 is hardly visible, with the outer surface of the casings 12 and 14 being substantially continuous at the crease 28. As discussed above, ambient air is drawn in through the one or more air inlets 24, filtered or purified within the air purifier 10, and then expelled back into the surrounding environment through the one or more air outlets 26. The air inlet(s) 24 and air outlet(s) 26 are preferably covered by the fabric covering 22 during operation of the air purifier 10 to allow air to enter and exit while preventing dirt, dust or other potentially harmful particles from entering the internal sections of the air purifier 10. In an embodiment, the covering 22 acts as a preliminary filter. Illustratively, a thin channel 30 extends about the circumference of the upper casing portion 14 above the air outlet(s) 26. This channel 30 may receive an upper edge of the fabric covering 22 when fitted to air purifier 10. The elastic nature of the fabric covering 22, if present, or an elastic at a top end of the covering 22, may help retaining it in place. When the fabric covering 22 is fitted to the air purifier 10 and its upper edge is received in the channel 30, the transition between the outer surface of the upper casing portion 14 and the fabric covering 22 may appear substantially seamless. Other retaining means for the fabric covering 22 may be considered as well. Moreover, a channel similar to the channel 30 may be present below the air inlet(s) 24 to serve the same purpose as the channel 30. As the lower casing portion 12 defines a downward taper, it may not be necessary to have another channel for the covering 22 to conform to the lower casing portion 12. If present, the feet 12b create a space between a bottom of the casing 12 and the ground, for an edge of the covering 22 to be lodged.

In the shown embodiment, the air inlets 24 are thin, vertical, slit-like openings distributed about a circumference of the lower portion of the lower casing portion 12, though they may be fewer (including a single one). The thinness of the air inlets 24 may additionally prevent unwanted larger particles from entering the air purifier 10, while the distribution of the air inlets 24 around the circumference of the lower casing portion 12 allows ambient air to be drawn in from multiple directions. Other numbers and shapes of air inlets 24 may be considered as well. Similarly, in the shown embodiment, the air outlets 26 are also thin, vertical, slit-like openings distributed about a circumference of the lower portion of the upper casing portion 14, though they may be fewer (including a single one). The air outlets 26 expel filtered or purified air in multiple directions in the illustrated embodiment. Other numbers and shapes of air outlets 26 may be considered as well. In an embodiment, the air outlets 26 may be part of vanes to assist in exhausting air from the air purifier 10. In such an embodiment, the walls between the air outlets 26 are oriented to be near a tangential relation with a fan in the air purifier 10. Stated differently, the walls between the air outlets 26 are oriented to be in a direction of air flow out of the fan, so as to limit air flow obstructions.

Referring to FIG. 4, if present, the removable pot 18 receives the substrate for the plant 16 and is removably insertable into and subsequently removable from the hollow inner receptacle within the upper casing portion 14 of the air purifier 10 via one or more handles 20. In various embodiments, the removable pot 18 may support the plant 16 before or after its insertion into the upper casing portion 14. In the shown embodiment, the removable pot 18 includes a flange 32 along an upper edge thereof, allowing the removable pot to securely sit within the upper casing portion 14 with the flange 32 resting against the upper edge of the upper casing portion 14. The removable pot 18 may further include a plurality of reinforcement tabs 34 on a lower surface of the flange 32, for instance to reinforce the flange 32 as the latter supports the weight of the plant 16 and the substrate. Illustratively, the upper casing portion 14 is frusto-conically shaped. Other shapes for the upper casing portion 14 may be considered as well, e.g., cylindrical, polygonal in cross-section, etc.

The removable pot 18 may further include a rubber seal or other such sealing means (not shown) to prevent dirt or water from entering the inner receptacle of the upper casing portion 14. The removable pot 18 includes a wall 36 that sits adjacent to an inner surface (not shown) of the upper casing portion 14 when the removable pot 18 is positioned within the upper casing portion 14. The wall 36 of the removable pot 18 defines a receiving cavity 38 for the substrate of the plant 16. In some embodiments, the receiving cavity 38 of the removable pot 18 may be completely sealed, i.e. there are no openings or perforations allowing dirt, water or any other such particles from entering the inner receptacle of the upper casing portion 14. In other cases, the inner receptacle of the upper casing portion 14 is completely sealed so as to prevent such particles from entering into the internal sections of the upper casing portion 14. In other cases, a removable liner (not shown) may be insertable in the upper casing portion 14 or the removable pot 18 to add further protection from the plant's 16 contents to the internals of the air purifier 10. Various combinations of these measures, as well as others, may be considered as well. The pot 18 may have any appropriate configuration, for instance with a perched water table, and underside water reservoir, etc., with some of these features shown. The pot 18 that is used with the air purifier 10 is for instance sealed, at its bottom, so as not to drip water or soil into the upper casing portion 14.

The removable pot 18 may be removed from the air purifier 10 for a variety of purposes. A user may remove the removable pot 18 housing a plant 16 to attend to the plant 16 remotely from the remainder of the air purifier 10. For example, the removable pot 18 may be removed from the air purifier 10 to be cleaned before a new plant 16 is introduced, either before or after the removable pot 18 is re-inserted into the upper casing portion 14. In other embodiments, a user may choose to have two or more air purifiers 10 spread throughout an office building, home or other location. In such cases, each removable pot 18 may house a different plant 16 so that the user may swap the removable pots 18 after a certain amount of time to alternate which plant 16 is in each air purifier 10. In an alternate embodiment, the upper casing portion 14 may itself be an integrated, non-removable pot section to receive a substrate and support the plant 16.

Figure 5:
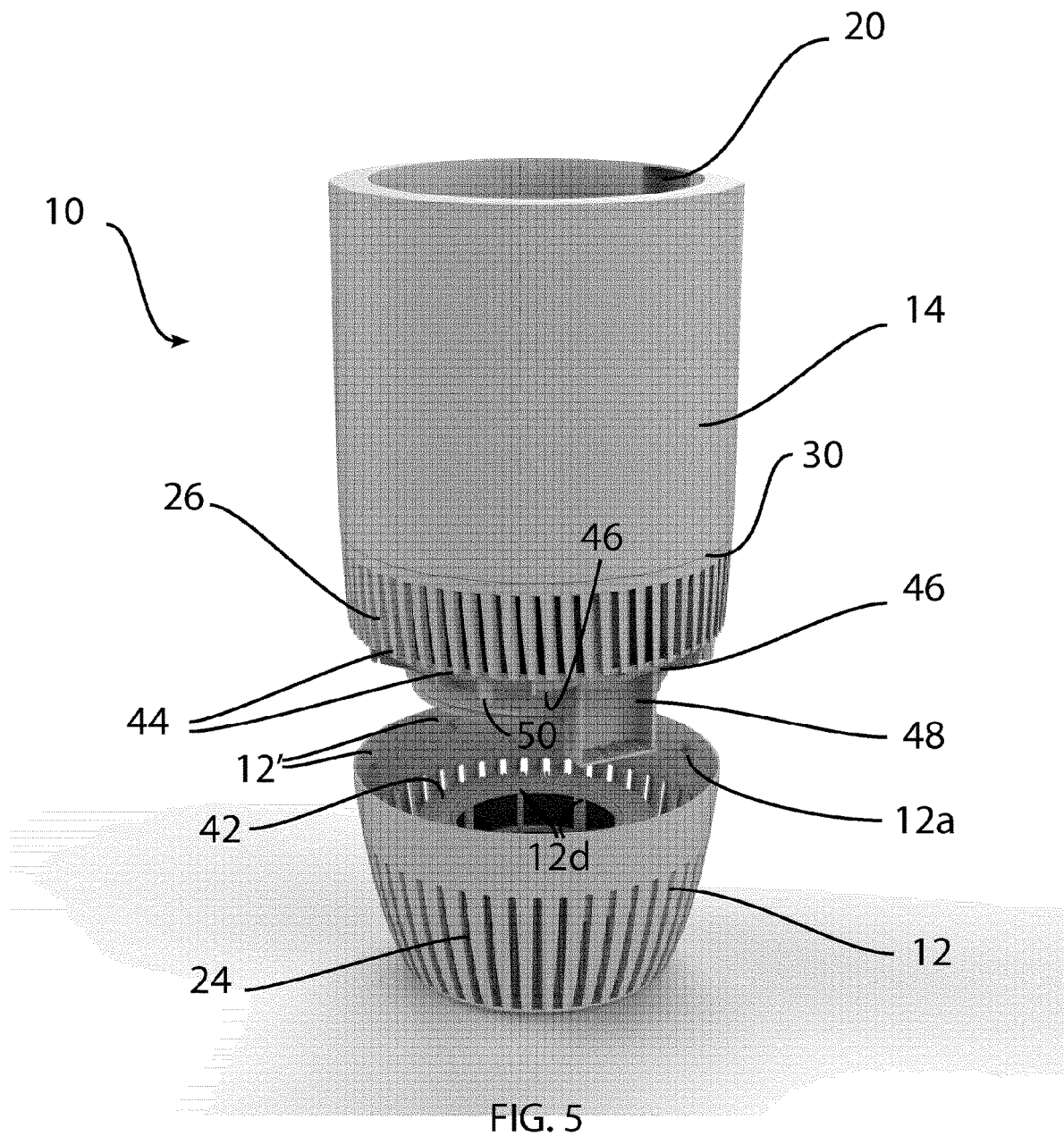
FIG. 5 is an exploded perspective view of the air purifier of FIG. 1 with the covering removed.

Referring to FIG. 5, the upper casing portion 14 may be detached or separated from the lower casing portion 12, for instance to access the internal components of the air purifier 10. However, the casing portion 12 and 14 may be tied together with fasteners, as it may be desired not to provide easy access to an interior of the air purifier 10. Hence, in an embodiment, a mechanical connection (e.g. fasteners, snap fit or the like) holds the casings 12 and 14 together, though the upper casing portion 14 may simply sit on the lower casing portion 12. A sealing member such as an annular rubberized gasket (or more than one), is optionally positioned about a circumference of a lower portion of the upper casing portion 14. The sealing member may alternatively or additionally be on the lower casing portion 12. The sealing member may be sized so as to be compressed when the upper casing portion 14 is in the lower casing portion 12, causing some mechanical force to hold the casings 12 and 14 together. FIG. 5 shows a filter 42 installed in the lower casing portion 12. Other internal components will be shown and discussed in further detail below. In an embodiment, the filter 42 is accessible via the base 12*a*. In another embodiment, the filter 42 is accessible by lifting the upper casing portion 14 upward off of the lower casing portion 12, thereby exposing the filter 42.

Figure 6:
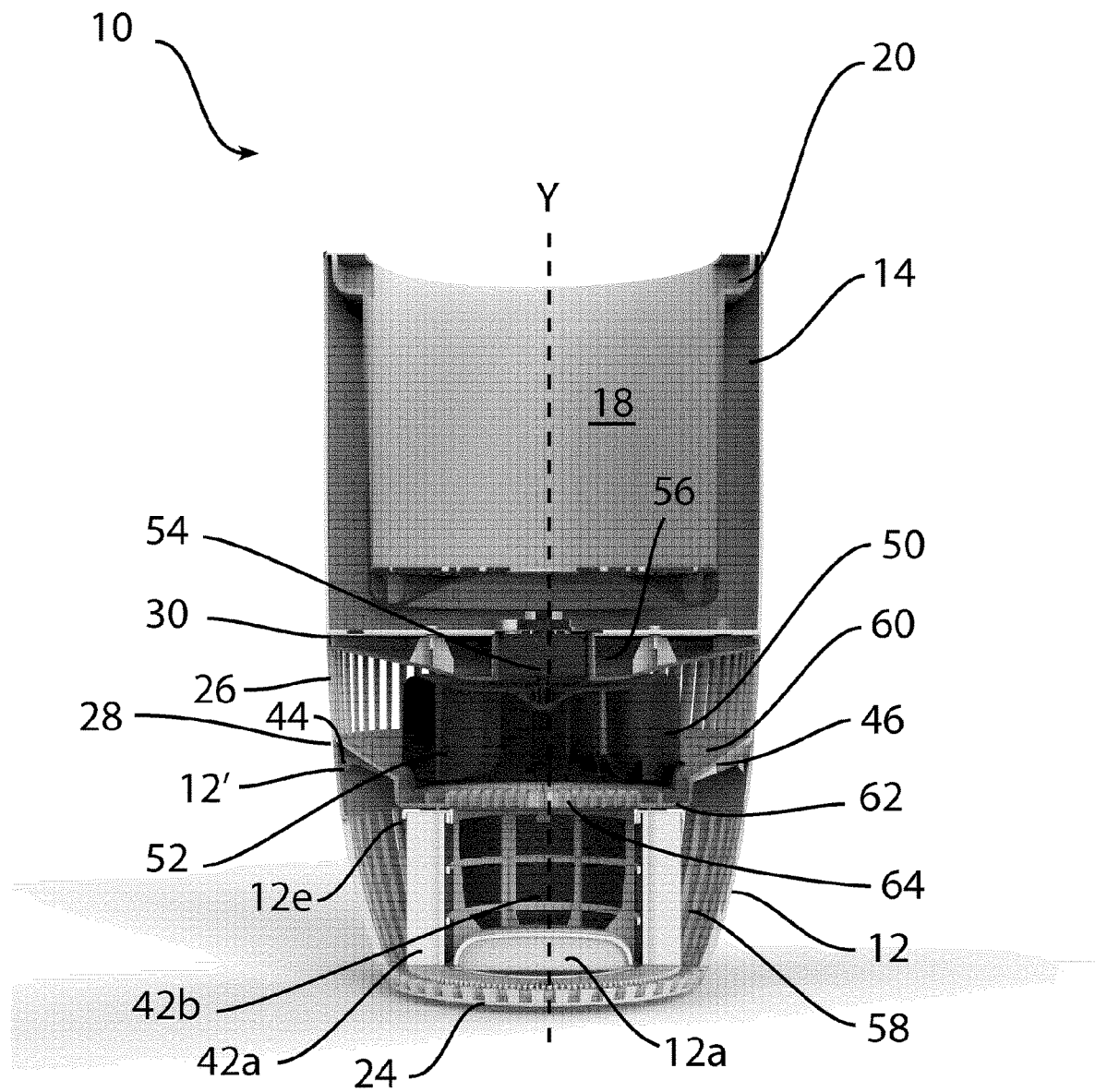
FIG. 6 is a sectioned view of the air purifier of FIG. 1.

As shown in FIG. 6, abutments 12' may be near the upper edge of the lower casing portion 12 and are provided to engage with webs 44 illustratively below the air outlet(s) 26, when the upper casing portion 14 is received by the lower casing portion 12, ensuring a continuous engagement between the casings 12, 14, hence forming the crease 28. The reverse arrangement is contemplated as well. Moreover, other complementary connection features may be present, including posts and receptacles, slots and tabs, etc. In other cases, various other retaining elements such as fasteners to retain the casings 12, 14 together may be considered as well.

In some embodiments, as can be seen in FIG. 5, the upper casing portion 14 may include a frustoconically-shaped bottom portion 46. Such a shape may facilitate insertion of the upper casing portion 14 into the lower casing portion 12. Other shapes for the bottom portion 46 of the upper casing portion 14 may be considered as well. The bottom portion 46 of the upper casing portion 14 may be removable from the upper casing portion 14 to allow access to various components housed within, as will be discussed in further detail below. Illustratively, the bottom portion 46 may have corresponding post(s) 50 or other fastener-retention means within the internal portion of the upper casing portion 14. As such, the bottom portion 46 may be detached from the upper casing portion 14 by removing the fastener(s), for instance to service or replace the various components housed within. The bottom portion 46 may then be reassembled with the upper casing portion 14 by subsequently refastening the fastener(s). Alternatively, the bottom portion 46 may have threadings on an outer surface thereof and the upper casing portion 14 may have a corresponding threaded portion on an inner portion thereof, so that detaching and reattaching the bottom portion 46 to/from the upper casing portion 14 may be done by rotating the bottom portion 46 clockwise/counter-clockwise. Other means for attaching the bottom portion 46 to the upper casing portion 14 may be considered as well. As discussed above, in some embodiments a single integral casing may be used, forming a chamber to house to various air purifier components. In such cases, the single integral casing would be separable, for instance via a removable top or bottom portion, to access the various internal components. Other access means for such a single integral casing may be considered as well. However, in an aspect, every day use of the air purifier 10 may not require a separation of the casings 12 and 14 (top and bottom).

Referring to FIG. 6, various internal components of the air purifier 10 are shown. As discussed above, the filter 42 is positioned within the lower casing portion 12. The filter 42 purifies or filters the ambient air drawn into the air purifier 10 before the air is expelled back into the surrounding environment. The shown filter 42 has an annular shape, i.e. having an annular inner filter wall 42*a* forming a central air plenum 42*b*. Other shapes for the filter 42 may be considered as well. While the illustrated air purifier 10 is shown with a single filter 42, in other embodiments the air purifier 10 may be provided with multiple filters 42, for instance arranged to purify or filter the air sequentially in different stages. Such multiple filters 42 may be arranged in a vertical configuration, i.e., one above the other, or with concentric arrangements (one inside the other), or may be integrated into a single filter 42, having various layers and/or components to perform different filtering actions. Other configurations for such multiple filters 42 may be considered as well. Various filter types may be considered, for instance based on the expected air quality of the surrounding environment, the types of particulate needing to be filtered out of the ambient air, or the size of such particles. Such filter(s) may be made from materials such as paper, fiber, mesh and/or charcoal, porous polymeric foam, and may receive various certifications pertaining to their filtration capabilities, for instance a HEPA filter. The filter(s) 42 may be disposable and replaceable after a certain amount of time or usage. In other cases, the filter(s) 42 may be washable and reusable. In an embodiment, the filter material is an accordion of paper arranged into the annular shape. It may also be possible to have the filter 42 come in a folded, flat and/or collapsed condition, with the filter 42 having little or no structural integrity to maintain an annular shape or cylindrical. The filter 42 may rely on a cage or any other structure with the air purifier 10 to adopt an appropriate 3D shape to be used in the air purifier 10.

Referring to FIG. 7, the filter 42 may be installed into the lower casing portion 12 via an underside thereof. For example, the base 12a may be screwed or attached in any appropriate manner to a remainder of the lower casing portion 12, such as to be detachable therefrom, and give access to an interior of the lower casing portion 12. The base 12a may have feet 12b upon which the air purifier 10 rests when standing upright. The feet 12b may have pads, though not shown, to increase the friction between the lower casing portion 12 and a ground. A handle 12c may also be present, especially if the base 12a is screwingly engaged to a remainder of the lower casing portion 12. Therefore, the filter 42 may simply sit on a top face of the base 12a. As the central air plenum 42b may be subjected to a lower pressure, the filter 42 may be at risk of collapsing, if it does not have sufficient structural integrity. The cage 12d or like support may be present as part of the base 12a, to help maintain the filter 42 in its annular shape. In an embodiment, the cage 12d is an integral part of the base 12a, such as being comolded with it. However, it is also considered to have the cage 12d be separate from the base 12a, such as being a discrete component of the air purifier 10. The cage 12d may also be part of other components of the air purifier 10, or may be integrated into the filter 42. It is also considered to have filters 42 that do not require a cage 12d. The cage 12d may be cylindrical or frusto-conical in shape, as examples among others.

The upper casing portion 14 includes a fan 52 driveable by an electric motor 54. Illustratively, both the electric motor 54 and the fan 52 are housed within the bottom portion 46 of the upper casing portion 14, the electric motor 54 sitting above the fan 52, although other configurations within the bottom portion 46 may be considered as well. The motor 54 may be housed within a motor casing 56, for instance having walls surrounding a top half of the motor 54 to isolate or seal the motor 54 from the inner cavity of the upper casing portion 14. As discussed above, the frustoconically-shaped bottom portion 46 of the upper casing portion 14 may be removable to allow access to the fan 52 and/or the electric motor 54, for instance for maintenance or replacement purposes. Once assembled, the upper section of the upper casing portion 14 sits within the bottom portion 46 of the upper casing portion 14, creating the outer channel 30.

The shown fan 52 is a centrifugal fan having a plurality of fan blades arranged about a central vertical axis Y, although other types of fans may be considered as well. In the shown embodiment, the filter 42 is positioned within a filter chamber 58 in the lower casing portion 12, while the fan 52 is positioned within a fan chamber 60 in the bottom portion 46 of the upper casing portion 14. A bottom wall 62 of the upper casing portion 14 delimits the filter chamber 58 from the fan chamber 60, while an air passageway with an optional directional plate or grill 64, fluidly connects the filter chamber 58 to the fan chamber 60. The optional directional plate or grill 64 may assist in directing the flow to a center of the fan 52. Though other types of fans may be use, the centrifugal fan 52 may be suitably used with the verticality of the air purifier 10 as it creates a vertical flow of air, assisted by the grill 64, to move air from the lower row of air inlets 24 to the upper row of air outlets 26. In an embodiment, an air inlet would be located at the undersurface of the air purifier (e.g., at the base 12a) and the filter 42 could be flat.

For the annular filter 42, the bottom wall 62 may firmly press against the top of the annular filter wall 42a when assembled (or against an optional annular cover 12e), preventing air drawn by the fan 52 from bypassing the filter 42. As such, air passes through sections of both the lower casing portion 12 and the upper casing portion 14 as it is drawn in, filtered, and expelled by the air purifier 10, as will be discussed in further detail below. Other configurations for the placement of the various components within the lower casing portion 12 and the upper casing portion 14 may be considered as well. In some embodiments, it may be contemplated to position the filter 42 above the fan 52. In such cases, or in other arrangements, the fan 52 would draw in air through the air inlet(s) 24 and push the air through the filter 42 before the air is expelled through the air outlet(s) 26.

The electric motor 54 draws power from a power source (not shown) to drive the fan 52. In some cases, the power source may be a nearby AC outlet to which the air purifier 10 connects via an attached power cord (not shown). In other cases, the air purifier 10 may include an onboard battery (not shown) to provide power to the electric motor 54 for a duration of time. Such a battery may be removable for recharging or replacement purposes. In other cases, the air purifier 10 may include a charging port (not shown), for instance a micro-USB port, to recharge the battery. In other cases, the electric motor 54 may be powered by disposable, single-use batteries that are replaceable once depleted. Other power sources may be considered as well. Moreover, a transformer, such as a 24V transformer may be present, for the motor 54 to run on low voltage, and for the air purifier 10 to be universal (with adequate power cord).

In use, the electric motor 54 drives the fan 52 to draw ambient air from the surrounding environment through the air inlets 24 (e.g., radially inward), into the filter chamber 58 and through the filter(s) 42 where the air is filtered or purified. Illustratively, although not necessarily the case in all embodiments, the fan 52 draws the air through annular filter wall 42a into the central air plenum 42b. Then, the air is drawn upward from the central air plenum 42b, through the air passageway with optional grill 64 in the bottom wall 62 of the upper casing portion 14, and into the central portion of the fan 52. As discussed above, the seal created by the bottom wall 62 engaging with the annular filter wall 42b or annular cover 12e may prevent air from bypassing the filter 42. The rotating blades of the fan 52 expel the air outward (e.g., tangentially or centrifugally outward) into the fan chamber 60 and then out through the air outlets 26 towards the surrounding environment. In the shown embodiment, although not necessarily the case in all embodiments, the annular filter 42, the fan 52 and the motor 54 are aligned along the central vertical axis Y.

The air purifier 10 is operable through various means. In some embodiments, a control panel (not shown) may be provided on an outer surface of the upper casing portion 14. The control panel may include buttons to turn the air purifier 10 on or off, as well as to control the speed of the fan 52. In other embodiments, the buttons may be replaced by a touchpad. Additionally, a display device (for instance an LCD screen) may be provided adjacent the control panel to display, for example, a status of the air purifier 10. In some cases, the display device may be touch-enabled and thus allow a user to control the functions of the air purifier 10 through touch gestures. Alternatively or in addition, a remote control may be provided to allow a user to control the air purifier 10 from a distance, for instance via an infrared (IR) remote control or IR blaster on the remote communicating with an IR receiver on the air purifier 10. In other embodiments, the air purifier 10 may include additional electronics allowing it to connect to, for instance, a local Wi-Fi network. A user may then download a corresponding mobile application to their mobile device allowing them to control the air purifier 10 through their mobile device, regardless of their location. Other means of controlling the air purifier 10 may be considered as well. It is contemplated to have all actuated components be part of a same portion of the air purifier 10. For example, the motor 54 and any display device and/or controller may be part of the upper casing portion 14, with the upper casing portion 14 having a battery or having a power cord for connection to a power source. For example, 14a may be a push button to actuate the system and may include a light display or other interface. In an embodiment, a sensor is located in the receptacle 48 and is configured to determine the quality of ambient air. As an example, the sensor is an infrared sensor, such as infrared dust sensor model PM1003, by Cubic Sensor and Instrument Co. Ltd, given merely as an example, and with laser sensors being an alternative. The sensor may be connected to the controller which may in turn provide a color display via the light display 14a, the light display being indicative of the air quality. The speed of the fan 52, as driven by the motor 54, may be in relation to the measured air quality, and may be automatically controlled.

As discussed above, in some cases the air expelled by the air purifier 10 through air outlets 26 does not directly come into contact with the plant 16. The positioning of the air outlets 26 towards the lower portion of the upper casing portion 14 as well as the expelled air's outward or radial direction may prevent the expelled air from blowing directly onto the plant 16, thus preventing any undesirable effects of unwanted airflow against the plant 16. In other embodiments, the air outlets 26 may include or be part of fixed or adjustable vanes or louvres (not shown), allowing a user to adjust the angle at which the expelled air exits the air purifier 10. Such louvres may, for instance, be adjusted manually or automatically via the above-discussed control panel. In such cases, the maximum upward angle of the louvres would be limited so that the expelled air would not directly contact the plant 16.

In addition, the elastic fabric covering 22, as well as the tight seal between the upper casing portion 14 and the lower casing portion 12, may ensure that any dirt, or other plant-related matter is prevented from entering the internal sections of the air purifier 10, i.e. where the electric and electronic components such as the motor 54 are found. As such, the risk of any damage to the electric or electronic components of the air purifier 10 relating to the presence of the plant 16 housed within the upper casing are minimized.

While the upper casing portion 14 and lower casing portion 12 are shown to have conically-shaped outer walls, other numbers and shapes of outer walls may be considered as well. For instance, the upper casing portion 14 (and the lower casing portion 12) may have a rectangular prism-like shape with four rectangular outer walls. In addition, while both the upper casing portion 14 and the lower casing portion 12 are shown to have narrowing widths towards the bottom of the air purifier 10, other shapes may be considered as well. For instance, both the upper casing portion 14 and lower casing portion 12 may each have cylindrical outer walls having a constant diameter along their heights.

Although the lower casing portion 12 is defined as having the inlets 24 and the upper casing portion 14 has the outlets 26, the reverse arrangement is contemplated, for instance by having the fan 52 drawn in the air in the upper casing portion 14 and expelling the air via the lower casing portion 12. The air passages 24, 26 may thus operate in a different manner than that as described above.

Referring to FIGS. 8 to 11, an embodiment of the air filter 42 is shown. The air filter 42 may be made of a panel 42c of porous material. In the illustrated embodiment, the panel 42c is an accordion like panel, i.e., a series or elongated panel portions in a zigzag pattern. The air filter 42 and is thus made of a non-rigid material, and may also feature another layer forming the wall 42a. The panel 42c may be for instance a paper and/or a non-woven fabric that has a desired filtering capacity. The other layer, optionally, may be a felt, a foam (e.g., open-cell foam), or like other porous material, that may provide complementary filtering characteristics, such as active carbon or charcoal, for example to perform filtering of volatile organic compounds. The other layer may be a foam with a charcoal or active carbon spray, a mesh or like honeycomb structure with charcoal or active carbon pellets, etc.

A holder 42d (a.k.a., binder, support, ring) may be present, to hold the panel 42c and ensures that the deformation of the accordion is even. For example, the holder 42d is a ring of a polymer (e.g., silicone) that has spikes or rays between two adjacent panel portions, such that the panel portions are tied together. More particularly, in the accordion configuration, there is a sequence of edges, i.e., inward, outward, inward, outward, etc., the edges being at the junction between panels, and being vertical fold lines (parallel to the central axis of the filter). The rays are between panels connected by an outward edge, and hence being two inward edges together. This may give the filter 42 the appearance of having rays, as in FIG. 8. The ring of the holder 42d is substantially thinner (e.g., less than 3 mm) than the overall height of the filter 42. The ring of the holder 42d may be viewed as a string, a cord, etc. There may be holders 42d at the extremities of the filter 42, and a central holder 42d as well.

As exemplary dimensions, the height of the filter 42 (i.e. along axis Y in use) is between 10.24 cm and 11.24 cm, the inner diameter is between 13.07 cm and 16.07 cm, the outer diameter is between 18.50 cm and 20.50 cm. These dimensions are optimal for the efficiency of the filter 42 in an apparatus such as the air purifier 42. The filter 42 is wider than higher.

Figure 8:
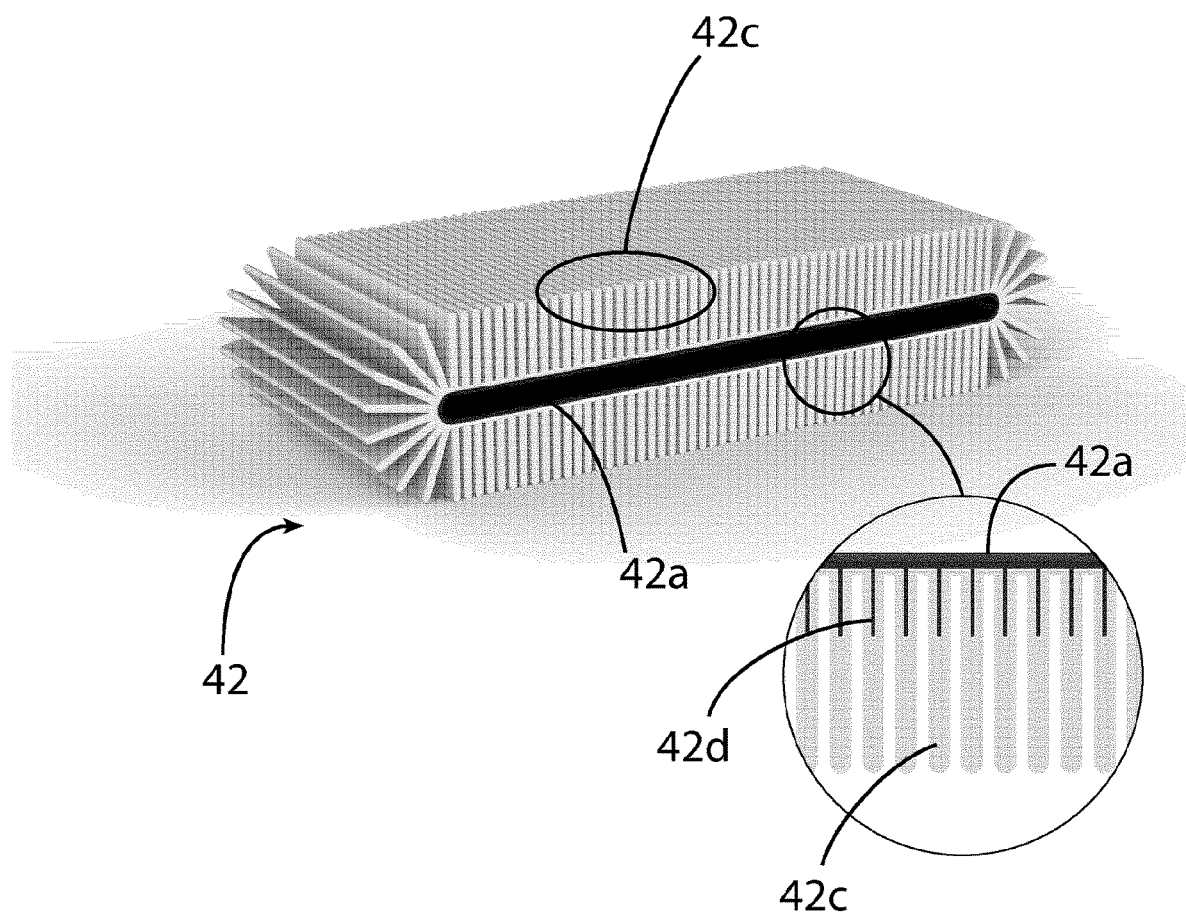
FIG. 8 is a perspective view of an air filter that may be used with the air purifier of FIG. 1, in a collapsed condition.
Figure 9:
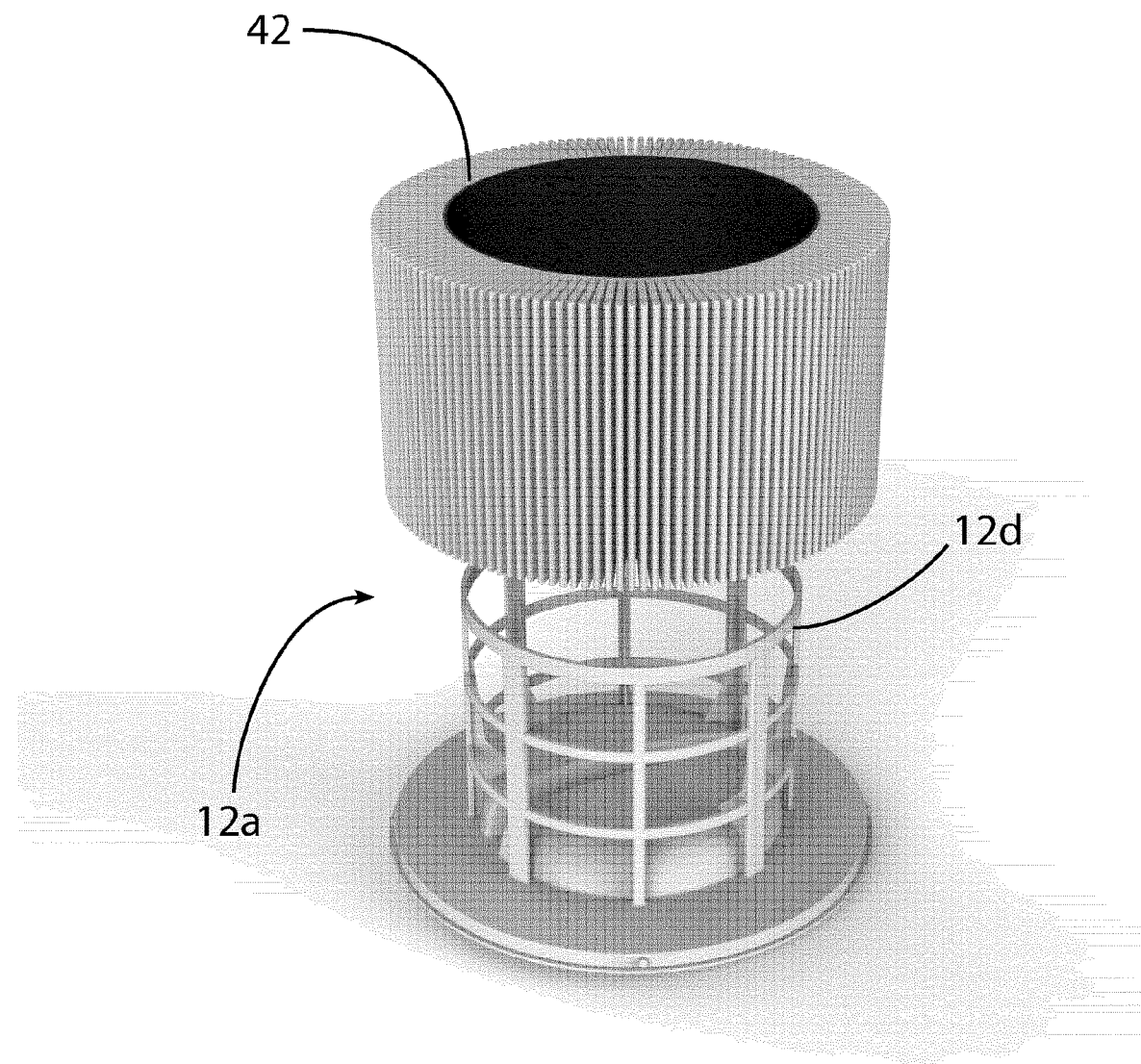
FIG. 9 is an assembly view of the air filter of FIG. 8, relative to a base of the air purifier of FIG. 1.
Figure 10:
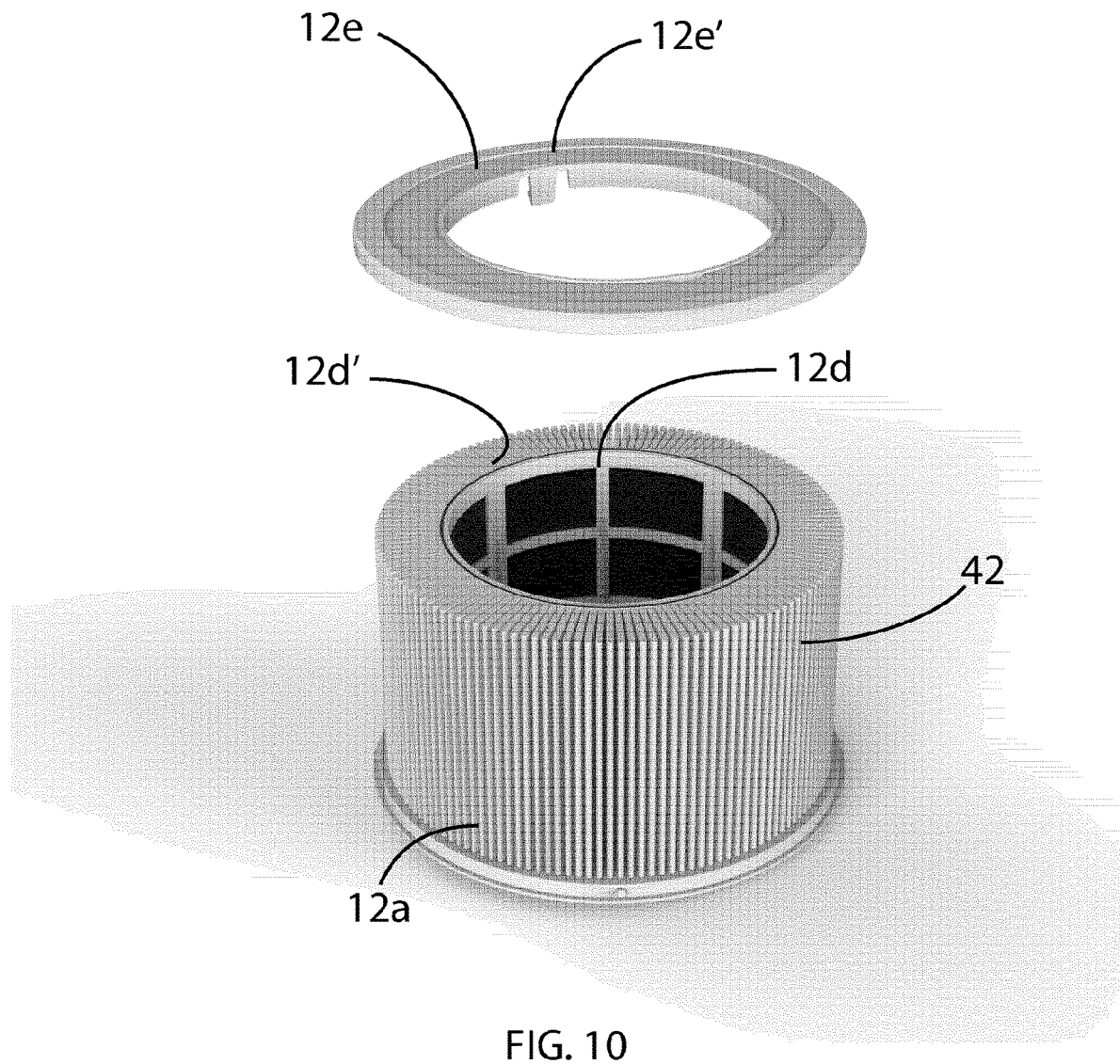
FIG. 10 is an assembly view of the air filter of FIG. 8 mounted to the base of the air purifier of FIG. 1 and in relation to an annular cover.
Figure 11:
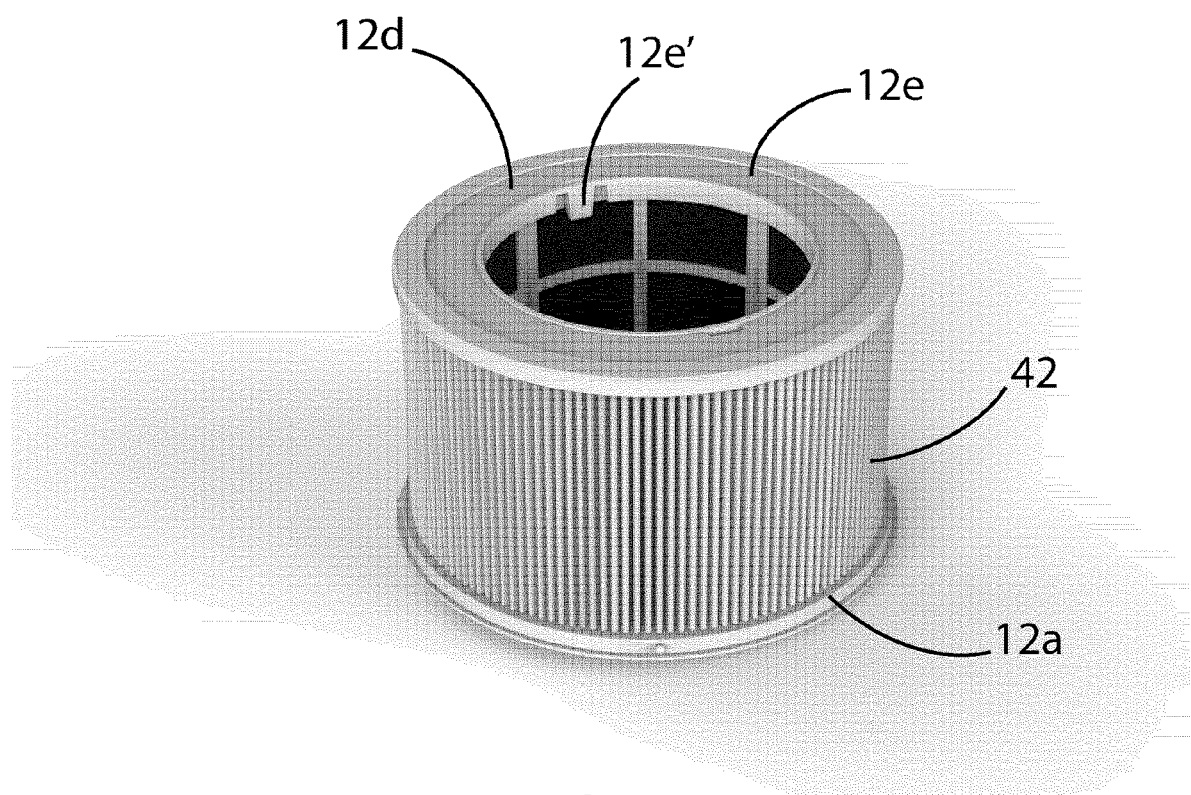
FIG. 11 is a perspective view of the air filter of FIG. 8 as assembled to the base with the annular cover.

As observed in FIG. 8, the air filter 42 is in a native collapsed state. The air filter 42 has a sleeve shape with opposed open ends, the sleeve shape defining an inner surface, i.e., that of the wall 42a, and an outer surface between the opposed open ends. The outer surface may be the accordion like surface, although other surfaces are possible. Stated differently, the porous material is in an accordion configuration, the air filter including a layer of another porous material surrounded by the accordion configuration, and holding inner edges of the accordion. The inner surface of the filter 42 is sized for the filter 42 to adopt a tubular shape with the porous material being taut to a filtering state when the air filter 42 is mounted onto a support being positioned against the wall 42a of the filter, the support being the cage 12d for example, as in FIGS. 9 to 11. Thus, in use, the filter 42 has its central axis generally vertical. In an embodiment, the inner surface has a constant cross-sectional dimension from one of the open ends to the other of the opposed ends. From its native collapsed state (FIG. 8), the filter 42 is mounted onto the support 12d, and the annular cover 12e may optionally be attached to a top of the support 12d for the filter 42 to be taut for filtering, and captive on the support 12d, such as between the base 12a and the annular cover 12e if present. The annular cover 12e may contribute to the sealing of filter 42 and its support, such that air may be drawn from the central plenum 42b. However, the height of the filter 42 may be such that an end of the filter 42 abuts against the wall 62 in an airtight manner, without the annular cover 12e. The annular cover 12e may be attached in any way to the support 12d, such as by tongues with wedges 12e' that elastically deform to clip onto a rim of the support 12d, or slots, etc. The annular cover 12e is laid against a top of the filter 42, in a generally air tight manner. The annular cover 12e may be sold with the filter 42 in a variant.

What is claimed is:

1. A method for replacing an air filter in an air purifier, the method comprising:
opening a lower casing portion of the air purifier to gain access to the air filter by removing a base of the lower casing portion to gain access to a filter chamber of the air purifier;
disengaging an annular cover of the air filter from an annular filter support, the annular cover being at an end of a first panel of porous material in a sleeve shape, the first panel of porous material of the air filter adapted to be used as a filter;
removing the first panel of porous material from the annular filter support of the air purifier; and
mounting a second panel of porous material onto the annular filter support.

2. The method according to claim 1, wherein removing the base from the lower casing portion includes unscrewing the base from the lower casing portion.

3. The method according to claim 1, wherein disengaging the annular cover includes unclipping the annular cover from the annular filter support.

4. The method according to claim 1, further comprising engaging the annular cover of the air filter with an end of the second panel after mounting the second panel onto the annular filter support.

5. The method according to claim 1, further comprising causing the second panel to unfold from a native collapsed state to a filtering state, the second panel in the filtering state having a tubular shape.

6. The method according to claim 5, wherein causing the second panel to unfold from the native collapsed state to the filtering state includes stretching the second panel to fit onto the annular filter support.

7. The method according to claim 1, wherein removing the base includes extracting the annular filter support from the filter chamber from an underside of the air purifier.

8. The method according to claim 1, wherein removing the base includes disengaging the annular cover of the air filter from a bottom wall of an upper casing portion, the bottom wall delimiting the filter chamber from a fan chamber of the upper casing portion.

9. The method according to claim 8, wherein disengaging the annular cover from the bottom wall includes unsealing an air passageway from the fan chamber to a central air plenum of the air filter.

10. The method according to claim 2, wherein unscrewing the base from the lower casing portion includes manually unscrewing the base via a handle.

11. The method according to claim 1, wherein mounting the second panel includes positioning an inner surface of the second panel against the annular filter support.

12. The method according to claim 11, wherein positioning the inner surface of the second panel against the annular filter support includes causing the second panel to adopt a tubular shape onto the annular filter support.

13. The method according to claim 1, wherein mounting the second panel onto the annular filter support includes seating an end of the second panel onto a top face of a removable base of the lower casing portion, the annular filter support being part of the base.

14. The method according to claim 1, further comprising engaging the annular cover of the air filter with an end of the second panel of porous material after having disengaged the annular cover from the annular filter support.

15. The method according to claim 1, further comprising aligning a central axis of the air filter having the second panel of porous material and the annular filter support with a central axis of the air purifier.

16. A method for replacing an air filter in an air purifier, the method comprising:
opening a lower casing portion of the air purifier to gain access to the air filter by removing a base of the lower casing portion to gain access to a filter chamber of the air purifier;
disengaging an annular cover of the air filter from an annular filter support, the annular cover being at an end of a first panel of porous material in a sleeve shape, the first panel of porous material of the air filter adapted to be used as a filter;
removing the first panel of porous material from the annular filter support of the air purifier; and
mounting a second panel of porous material onto the annular filter support by seating an end of the second panel onto a top face of a removable base of the lower casing portion, the annular filter support being part of the base.

17. The method according to claim 16, wherein removing the base from the lower casing portion includes unscrewing the base from the lower casing portion.

18. The method according to claim 16, wherein disengaging the annular cover includes unclipping the annular cover from the annular filter support.

19. The method according to claim 16, further comprising engaging the annular cover of the air filter with an end of the second panel after mounting the second panel onto the annular filter support.

20. The method according to claim 16, further comprising causing the second panel to unfold from a native collapsed state to a filtering state, the second panel in the filtering state having a tubular shape.

21. The method according to claim 20, wherein causing the second panel to unfold from the native collapsed state to the filtering state includes stretching the second panel to fit onto the annular filter support.

22. The method according to claim 16, wherein removing the base includes extracting the annular filter support from the filter chamber from an underside of the air purifier.

23. The method according to claim 16, wherein removing the base includes disengaging the annular cover of the air filter from a bottom wall of an upper casing portion, the bottom wall delimiting the filter chamber from a fan chamber of the upper casing portion.

24. The method according to claim 23, wherein disengaging the annular cover from the bottom wall includes unsealing an air passageway from the fan chamber to a central air plenum of the air filter.

25. The method according to claim 17, wherein unscrewing the base from the lower casing portion includes manually unscrewing the base via a handle.

26. The method according to claim 16, wherein mounting the second panel includes positioning an inner surface of the second panel against the annular filter support.

27. The method according to claim 26, wherein positioning the inner surface of the second panel against the annular filter support includes causing the second panel to adopt a tubular shape onto the annular filter support.

28. The method according to claim 16, further comprising engaging the annular cover of the air filter with an end of the second panel of porous material after having disengaged the annular cover from the annular filter support.

29. The method according to claim 16, further comprising aligning a central axis of the air filter having the second panel of porous material and the annular filter support with a central axis of the air purifier.

30. The method according to claim 16, further comprising removing a plant pot from a top of the air purifier prior to opening the lower casing portion.

31. The method according to claim 1, further comprising removing a plant pot from a top of the air purifier prior to opening the lower casing portion.

* * * * *